United States Patent [19]

Blair et al.

[11] 4,029,155

[45] June 14, 1977

[54] FLOATING MOUNT FOR AGRICULTURAL FINISH TOOLS

[75] Inventors: Calvin B. Blair, Barnard; Lee J. Brinker, Glen Elder; Thomas W. Ankenman, Tipton, all of Kans.

[73] Assignee: Kent Manufacturing Co. Inc., Tipton, Kans.

[22] Filed: June 23, 1975

[21] Appl. No.: 589,124

[52] U.S. Cl. .............................. 172/763; 172/142; 172/198; 172/488; 172/501; 172/615; 172/620; 172/657

[51] Int. Cl.² ................... A01B 23/04; A01B 49/02

[58] Field of Search ............ 172/76, 117, 142, 145, 172/146, 147, 148, 149, 150, 151, 175, 176, 177, 178, 179, 180, 181, 193, 194, 195, 196, 197, 198, 199, 200, 239, 259, 307, 311, 456, 501, 617, 618, 619, 620, 624, 629, 633, 640, 657, 658, 662, 682, 712, 714, 762, 763, 764, 776, 488; 403/117, 385, 400; 24/81 CR, 243 FM, 243 S

[56] References Cited

UNITED STATES PATENTS

| 1,798,739 | 3/1931 | Hoiland | 172/658 |
| 2,619,887 | 12/1952 | Burrows | 172/259 |
| 3,314,485 | 4/1967 | Godbersen | 172/178 |
| 3,500,936 | 3/1970 | Vigen | 172/198 |
| 3,708,019 | 1/1973 | Ryan | 172/484 X |
| 3,774,694 | 11/1973 | Gates | 172/617 |
| 3,921,726 | 11/1975 | Connor et al. | 172/484 X |

Primary Examiner—Richard T. Stouffer
Attorney, Agent, or Firm—Fishburn, Gold & Litman

[57] ABSTRACT

A trailing floating mount for agricultural finish tools is connected to the wheeled frame of an implement carriage and includes an elongated, longitudinally oriented finish tool draw bar attached to the carriage by a double-stop bracket which allows the bar freedom to pivot in a vertical plane through an angle sufficient to follow ground contours but limited so that when the implement frame is raised for transport, the draw bar, with the finish tools attached, is also raised but prevented from folding into the implement carriage or tools.

6 Claims, 5 Drawing Figures

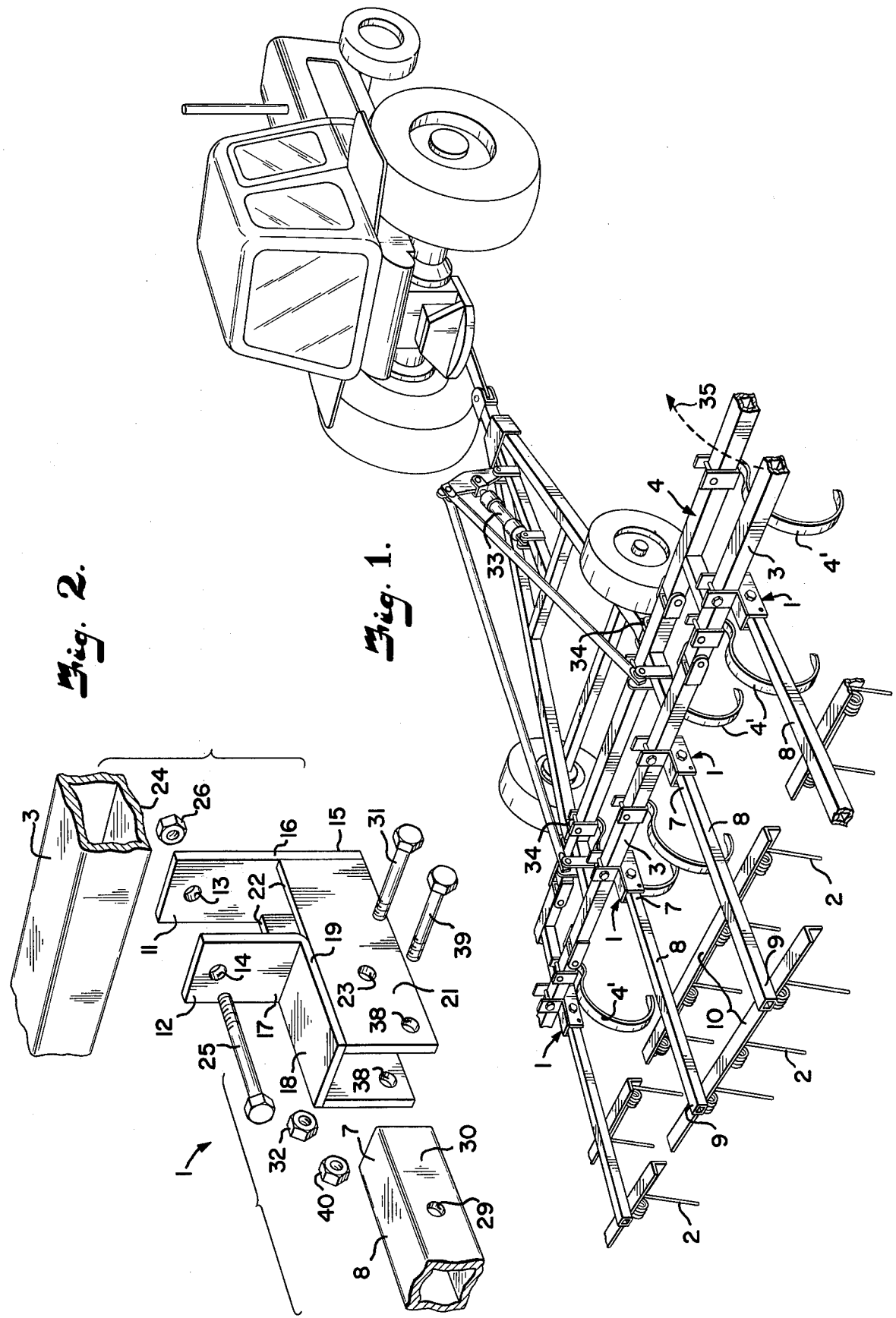

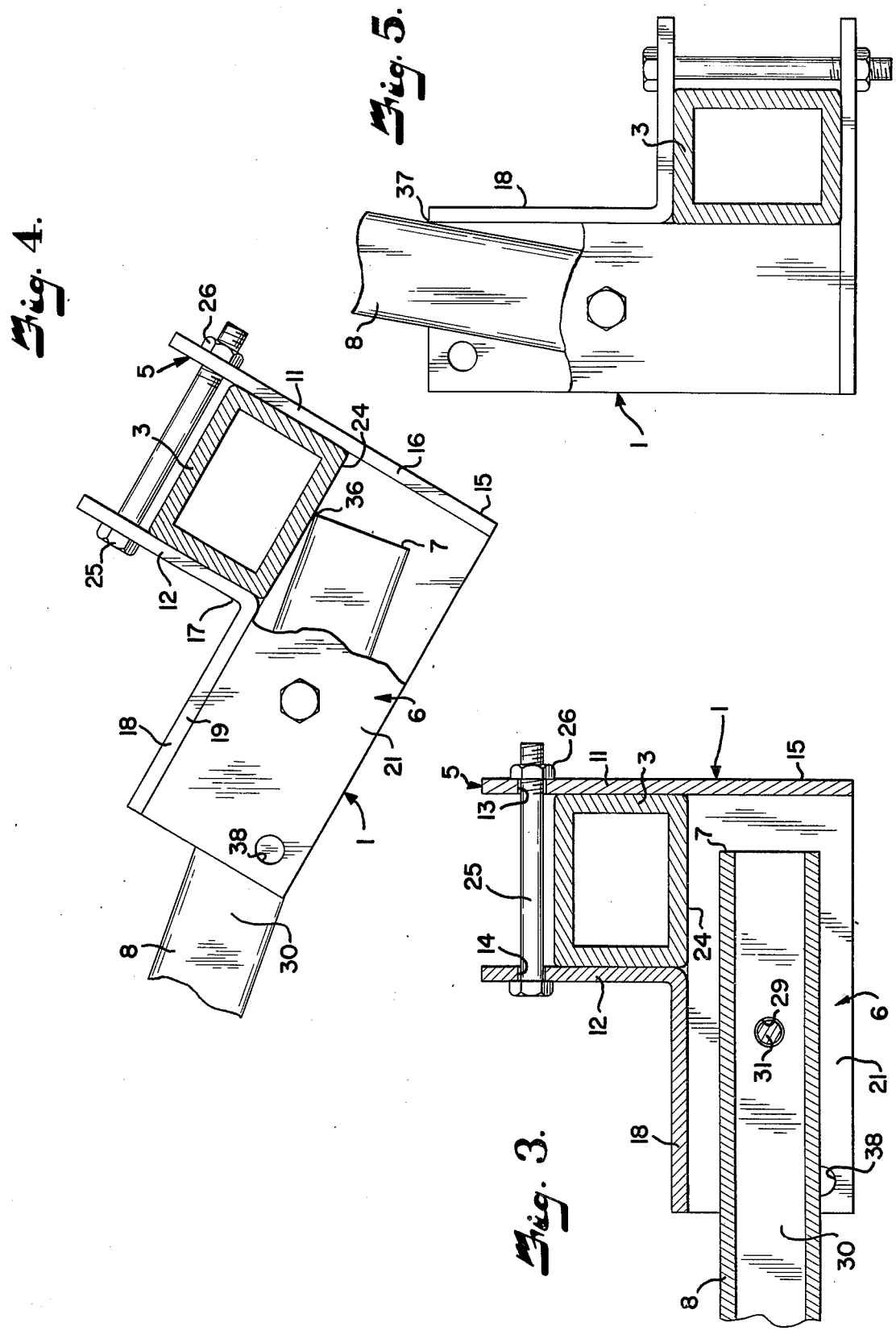

FLOATING MOUNT FOR AGRICULTURAL FINISH TOOLS

The present invention relates to tillage tools, and more particularly to an improved mounting arrangement for finish tools used in conjunction with carriage frame cultivators which may be of the foldable type, one example of which is disclosed in U.S. Pat. No. 3,502,154.

In tillage operations, it has been recognized that considerable time and money can be saved, and soil packing reduced, by decreasing the number of swaths necessary to cover a given area. Consequently, implement carriages have been modified to substantially simultaneously perform multiple functions. One desirable combination of functions has been found to result from adding seed bed finishing tools, such as coil spring harrows, to a heavy carriage which supports cultivator tools, such as spring teeth or chisels. Such additions, however, have been heretofore accomplished through complex and expensive connecting devices which proved less than satisfactory in use and/or were imcompatible with modern transport lifting and folding arrangements of the implement carriages to which they were attached. For example, prior art connecting devices often failed to provide the desired freedom of motion for efficiently following land contours and/or tended to fall into damaging contact with carriage structures or cultivator tools during lifting for transport and travel in the lifted position.

The principal objects of the present invention are: to provide a simple but effective arrangement for cooperatively mounting agricultural finish tools to the frame of an implement carriage; to provide a finish tool mounting device which permits the finish tools to closely follow incident terrain contours while restricting undesirably excessive motion thereof; to provide such a device wherein hinging of the added tool assembly with respect to the carriage frame is limited in two directions; decreasing the risk of damage to or interference with adjacent equipment and injuries to personnel during lifting, folding or transport; to provide such a tool mount that is econimical to manufacture while being versatile, durable and positive in operation; and to provide such a mount that is particularly well suited for its intended purpose.

Other objects and advantages of this invention will become apparent from the following description taken in connection with the accompanying drawings wherein are set forth, by way of illustration and example, certain embodiments of this invention.

FIG. 1 is a perspective view of the floating finish tool mount attached to a sectionalized, liftable and foldable implement carriage.

FIG. 2 is an enlarged, exploded, fragmentary, perspective view of the floating mount.

FIG. 3 is a fragmentary longitudinal sectional view of the mount, on enlarged scale, shown in an operational or tillage position.

FIG. 4 is a fragmentary side elevational view on the scale of FIG. 3, showing the mount in a mid-lift position.

FIG. 5 is a fragmentary side elevational view, on the scale of FIG. 3, showing the mount in a vertical position for storage or transport.

Referring to the drawings in more detail:

The reference numeral 1 generally designates a floating mounting device or mount for attaching an array of tillage tools, in this example coil spring harrow tines 2, to a trailing, transverse by extending draw frame bar or member 3 of a sectionalized, foldable implement carriage 4 carrying cultivating spring teeth 4'.

The tool mount 1 comprises a clamp forming bracket 5 adapted to removably, engage the transverse frame member 3, and a hinge forming bracket 6 which receives the forward end 7 of a longitudinal support member or draw bar 8. The rear portion 9 of the draw bar 8 has attached thereto one or more transverse members, such as elongated angles 10, which support the tines 2 laterally spaced therealong.

The clamp forming bracket 5 includes generally upstanding front and rear plate members 11 and 12, illustrated here as generally planar in shape, with longitudinally aligned bolt receiving apertures 13 and 14 near the upper ends thereof. The accompanying figures illustrate the transverse frame member 3 as having a rectangular, tabular cross section, however, it may assume any suitable cross section with appropriate modifications to plate members 11 and 12.

The lower portion 15 of the front plate member 11, has opposite side edges 16. Projecting rearwardly from the lower end 17 of the rear plate member 12 is a normally horizontal top support plate 18, in this example formed with the plate number 12 by bending a single elongated piece of stock. Top support plate 18 has opposite side edges 19 which are generally aligned in vertical planes with the front plate member edges 16.

Laterally spaced side plates 21 are secured to and depend from top support plate 18 at the opposite edges 19 and are attached, to front plate member 11 at the opposite edges 16 thereof, the connections being preferably made by welding. The side plates 21 are preferably parallel, vertical planes, and are generally rectangular in shape, each having a top edge 22. The side plates 21 form the principal constituents of the hinge forming bracket 6, each having mutually aligned, hinge pin receiving apertures 23 formed adjacent respective intermediate portions thereof.

When it is desired to attach additional tillage tools to the implement carriage 4, the tool mount 1 is urged upwardly against the transverse frame member 3 with the plate members 11 and 12 adjacent opposite vertical surfaces. The upper edges 22 of the side plates 21 contact the lower surface 24 of transverse member 3 limiting further upward motion. A threaded bolt 25 is passed through apertures 13 and 14 of the respective plate members 11 and 12 above the frame member 3 and a nut 26 is threaded onto the bolt 25 and tightened, producing clamping engagement.

The longitudinal support member 8 is here illustrated as a square cross section, tubular member with aligned apertures 29 formed in the lateral walls 30 and spaced somewhat rearwardly of the front end 7 thereof. The front end 7 is received between the side plates 21 and the apertures 29 are aligned with the apertures 23. A hinge bolt 31 is passed through the sets of apertures 23 and 29, and a nut 32, or other suitable fastener, is secured thereon.

During normal field operation, the support member 8 assumes a generally horizontal position where it is unobstructed in its ability to pivot about the pin 31 in a vertical plane over an acute angle sufficient to permit the tines 2 to freely float on the terrain, FIGS. 1 and 3. When it is desired to lift the implement out of soil contact, as for transport purposes, a hydraulic cylinder 33 is actuated, causing the carriage 4 to pivot upwardly and forwardly about hinges 34, as shown by the arrow 35, to either an intermediate or full vertical position. As the frame member 3 rotates (clockwise as shown in FIG. 4) during lifting the longitudinal support member end 7 contacts the frame member 3 at an area of contact 36, thereby limiting pivoting and causing the tines 2 to be lifted from the soil.

If the carriage 4 is rotated to a full vertical position (FIG. 5), the support members 8 may pivot forwardly, but are restricted from falling into contact with adjacent structure or ground working tools by contact with the top support plate 18 at 37. Thus, freedom of motion is permitted for ground working while providing positive stops to control lifting and vertical storage positioning of the tine harrow structure.

The precise degree of angular freedom of the longitudinal support member 8 with respect to the tool mount 1 is determined by a number of factors which may be varied to accommodate particular proportions and relationships in the overall structure. Such factors include: the vertical thickness of longitudinal support member 8, the location of apertures 29, the vertical dimensions of side plates 21, and the location of the side plate apertures 23.

As noted above, when not in transportation or storage positions the longitudinal support members 8 have a degree of angular freedom such that the tools 2 may float, that is, seek their own level with respect to the ground surface during tillage operations. However, at times it is desirable to disengage the tools 2 while continuing to utilize heavier tools, such as the spring teeth 4'. This is accomplished, in this example, by providing a second set of aligned apertures or openings 38 in the side plates 21 which are positioned rearwardly and below the opening 23 to receive a bolt 39 beneath the longitudinal support member 8 as the latter is lifted with respect to the mount 1. A nut 40 or the like may be used to insure retention of the bolt 39 which will permit the tines 2 from contacting the ground, even though the tools 4' are in operable position.

It is to be understood that while certain forms of this invention have been illustrated and described, it is not to be limited thereto except insofar as such limitations are included in the following claims.

What I claim and desire to secure by Letters Patent is:

1. In combination, a transverse draw frame bar, a trailing tillage tool support member, and a mounting device attaching a forward end of said tool support member to said draw frame bar; said mounting device comprising:
   a. means pivotally attaching said tool support member to said draw frame bar for limited pivotal movement thereof with respect to said bar in a substantially vertical and rearwardly projecting plane; said pivotal attaching means being disposed normally below said draw frame bar and including:
      1. a top panel having an upper surface, a lower surface, and a rearward end;
      2. first and second side panels depending from and connected with said top panel; said side panels being substantially parallel and spaced apart; said tool support member being disposed longitudinally between said side panels;
      3. means pivotally connecting said support member with said side panels at a point on said support member spaced rearwardly and apart from the forward end thereof; the forward end of said tool support member, when pivoted in one direction a sufficient distance, engaging a surface generally in the plane of the lower surface of said top panel, thus forming a first stop to limit said pivotal movement in one direction;
      4. said tool support member having an upper surface area thereof disposed rearwardly of said point of pivot; said support member upper surface area engaging the lower surface of said top panel at a point thereon disposed adjacent to the rearward end thereof, when said forward end of said support member is pivoted a sufficient distance in the other direction, thus forming a second stop, the pivotal movement of said support member being limited in the other direction upon sufficient pivotal movement in said other direction, said pivotal movement being limited between said first and second stops to an acute angle;
   b. clamping means securing said mounting device to said draw frame bar and including:
      1. an upstanding front plate having an aperture adjacent an upper free edge thereof, and a lower edge thereof connected with a forward end of said mounting device, so as to be fixed with respect to said top panel;
      2. an upstanding rear plate having an aperture adjacent an upper free edge thereof and a lower edge thereof connected with said top panel; said rear plate aperture being aligned with said front plate aperture;
      3. said front and rear plates being spaced apart to closely receive therebetween said frame bar; and
      4. means received in said front and rear plate apertures and urging the same tightly into frictional engagement respectively with leading and trailing surfaces of said draw frame bar.

2. A combination as set forth in claim 1 wherein:
   a. said rear plate is integral with said top panel.

3. A combination as set forth in claim 1 wherein:
   a. said side panels each have a first end thereof spaced forwardly of the forward end of said tool support member; and including
   b. a back panel connected with each of said side panel first ends and extending therebetween.

4. A combination as set forth in claim 3 wherein:
   a. said rear plate is integral with said top panel; and
   b. said front plate is integral with said back panel, whereby the forward end of said tool support member engages a lower surface of said draw frame bar for limiting said pivotal movement, said lower surface of said draw frame bar being said surface generally in the plane of said lower surface of said top panel.

5. A combination as set forth in claim 1 including:
   a. a set of aligned retainer pin receiving apertures in said side panels and adapted to receive therethrough a retainer pin operable to further limit said pivotal movement.

6. In combination, a draw frame bar, a trailing tillage tool support member, and a mounting device; said mounting device comprising:
   a. first and second side panels being mutually parallel and spaced apart, and receiving said support member therebetween, said side panels being oriented transversely of and connected with said draw frame bar and each having first and second end and side edges respectively;

b. means pivotally mounting a forward end of said support member in said side panels at a point on said support member spaced apart from said forward end for limited pivotal movement of said support member in a substantially vertical and rearwardly projecting plane; the forward end of said support member, when pivoted in one direction, engaging a first surface of said draw frame bar and forming a first stop to limit said pivotal movement in said one direction;

c. an angle member having a base with first and second planar surfaces and an arm upstanding normally therefrom and including a free edge; said base first surface being attached to the first side edges of said side panels; said base having a first end edge thereof positioned a spaced apart distance from said side panel first end edges;

d. a back plate attached to each of said side panel first end edges and extending beyond the first side edges thereof; said back panel being disposed substantially parallel with said arm and having a free edge; said arm and back plate being spaced apart and closely receiving therebetween said draw frame bar; said draw frame bar abutting a portion of said side panel first side edges;

e. means positioned in said arm and back plate adjacent to the respective free edges thereof and urging the same tightly into frictional engagement with opposing surfaces of said draw frame bar; and f. said support member having a surface area thereof disposed rearwardly of said point of pivot, which surface area, when said forward end of said support member is pivoted in the other direction, engages the first surface of said base at a point thereon disposed adjacent to the second end edges of said side panels thus forming a second stop whereby the pivotal movement of said support member is limied in said other direction; said pivotal movement being limited between said first and second stops to an acute angle.

* * * * *